US012570091B2

(12) United States Patent
Seo et al.

(10) Patent No.: US 12,570,091 B2
(45) Date of Patent: Mar. 10, 2026

(54) PUMP APPARATUS AND CONTROL METHOD THEREOF, PRINTING APPARATUS, AND STORAGE MEDIUM

(71) Applicant: CANON KABUSHIKI KAISHA, Tokyo (JP)

(72) Inventors: Mizuki Seo, Kanagawa (JP); Naoki Uchida, Kanagawa (JP); Yusuke Kiyokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 18/618,969

(22) Filed: Mar. 27, 2024

(65) Prior Publication Data

US 2024/0326457 A1 Oct. 3, 2024

(30) Foreign Application Priority Data

Mar. 30, 2023 (JP) ................................ 2023-056357

(51) Int. Cl.
*B41J 2/175* (2006.01)
*B41J 2/045* (2006.01)

(52) U.S. Cl.
CPC ....... *B41J 2/17596* (2013.01); *B41J 2/04536* (2013.01); *B41J 2202/12* (2013.01)

(58) Field of Classification Search
CPC ................ B41J 2/17596; B41J 2/04536; B41J 2202/12; B41J 2/175; B41J 29/38
See application file for complete search history.

(56) References Cited

FOREIGN PATENT DOCUMENTS

| | | | |
|---|---|---|---|
| JP | 2006238564 A | | 9/2006 |
| JP | 2010227785 A | * | 10/2010 |

OTHER PUBLICATIONS

Nishimoto Miki et al., "Pump Device and Coating Apparatus", Oct. 1, 20104, [First Embodiment] (Year: 2010).*

* cited by examiner

*Primary Examiner* — Lisa Solomon
(74) *Attorney, Agent, or Firm* — Canon U.S.A., Inc. IP Division

(57) ABSTRACT

A pump apparatus configured to circulate liquid in a printhead configured to discharge the liquid includes a drive unit configured to circulate the liquid, and a control unit configured to control operation of the drive unit based on information related to vibration of the printhead such that the printhead does not resonate due to vibration of the operation of the drive unit.

15 Claims, 8 Drawing Sheets

PUMP APPARATUS AND CONTROL METHOD THEREOF, PRINTING APPARATUS, AND STORAGE MEDIUM

BACKGROUND

Field of the Disclosure

The present disclosure relates to a technique for circulating ink in a printing apparatus.

Description of the Related Art

In an inkjet type printing apparatus that forms an image by discharging ink onto a printing sheet, ink is circulated by driving a circulation pump in order to prevent solidification or sedimentation of the ink. In particular, an ink circulation pump including a piezoelectric element as a driving source may be used as the circulation pump.

For example, in Japanese Patent Laid-Open No. 2006-238564, a drive circuit that can drive a plurality of piezoelectric elements is disclosed.

According to the technique disclosed in Japanese Patent Laid-Open No. 2006-238564, designing can be facilitated by reducing the maximum voltage of the entire circuit including not only the drive circuit of piezoelectric elements but also peripheral circuits and then reducing the withstand voltage of the components being used.

However, when the circulation pump is driven by using the piezoelectric element, the peripheral mechanism may resonate depending on the drive frequency of the piezoelectric element, and thus vibration may be generated. It is therefore beneficial to control driving of piezoelectric elements more specifically.

SUMMARY

The present disclosure, aims to effectively suppress vibration caused by driving of a circulation pump in a printing apparatus.

According to a first aspect of the present disclosure, there is provided a pump apparatus configured to circulate liquid in a printhead configured to discharge the liquid, the pump apparatus including a drive unit configured to circulate the liquid, and a control unit configured to control operation of the drive unit based on information related to vibration of the printhead such that the printhead does not resonate due to vibration of the operation of the drive unit.

According to a second aspect of the present disclosure, there is provided a printing apparatus including a pump apparatus configured to circulate liquid in a printhead configured to discharge the liquid, the pump apparatus including a drive unit configured to circulate the liquid, and a control unit configured to control operation of the drive unit based on information related to vibration of the printhead such that the printhead does not resonate due to vibration of the operation of the drive unit; the printhead; and a carriage configured to cause the printhead to reciprocally scan.

According to a third aspect of the present disclosure, there is provided a method for controlling a pump apparatus including a drive unit configured to circulate liquid in a printhead configured to discharge the liquid, the method including controlling, based on information related to vibration of the printhead, operation of the drive unit such that the printhead does not resonate due to vibration of the operation of the drive unit.

Further features of the present disclosure will become apparent from the following description of embodiments with reference to the attached drawings.

DESCRIPTION OF THE EMBODIMENTS

Figure 1:
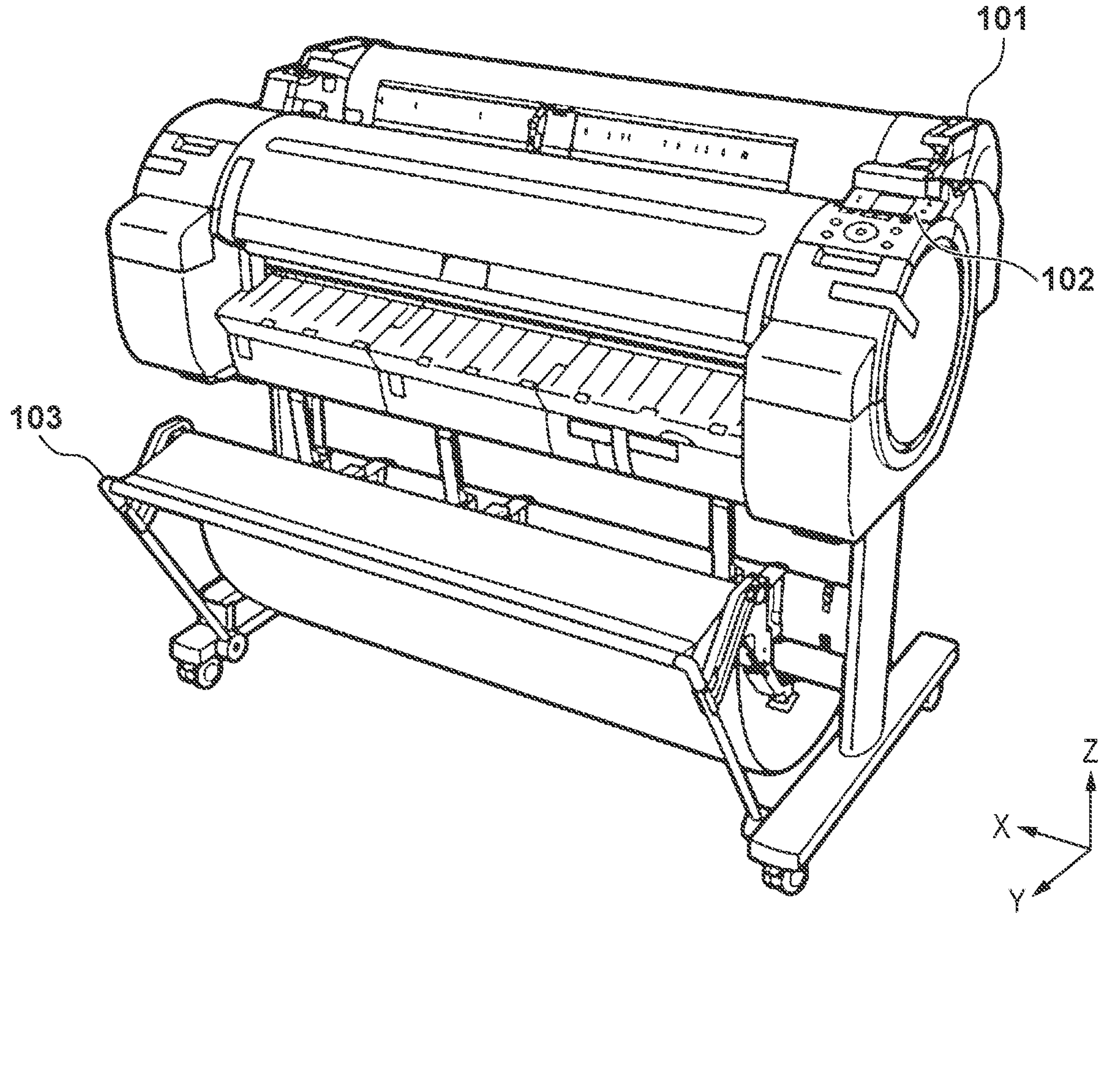
FIG. 1 is a perspective diagram of an ink jet printing apparatus according to a first embodiment of the present disclosure.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

In the following description of embodiments, "printing" not only includes forming meaningful information such as characters or graphics, but also includes forming images, patterns or the like on a sheet, in a broader sense. In addition, although the sheet in the present embodiment is assumed to be a "roll sheet", it may be a cut sheet, a cloth, a plastic film, or the like. Furthermore, the term "ink" should be interpreted in a broad sense and refer to any liquid that can be adopted, by being applied on a sheet, for forming images, patterns or the like or processing the sheet, or processing the ink.

First Embodiment

<Configuration of Inkjet Printing Apparatus>

FIG. 1 is a perspective diagram of an inkjet printing apparatus 101 (printing apparatus 101, in the following) according to a first embodiment of the present disclosure.

The printing apparatus 101 includes an operation panel 102 configured to display various printing information or setting results, and a basket 103 configured to stack print media being cut, on which images are printed. The operation panel 102 is an interface module that accepts various operations from a user. The user can perform various settings for the printing apparatus 101 using various switches or the like included in the operation panel 102. The various settings for the printing apparatus 101 include, for example, settings of size and type of the print medium, drive frequency of the circulation pump 202 included in a printhead 201 (see FIG. 3), or the like.

Figure 2:
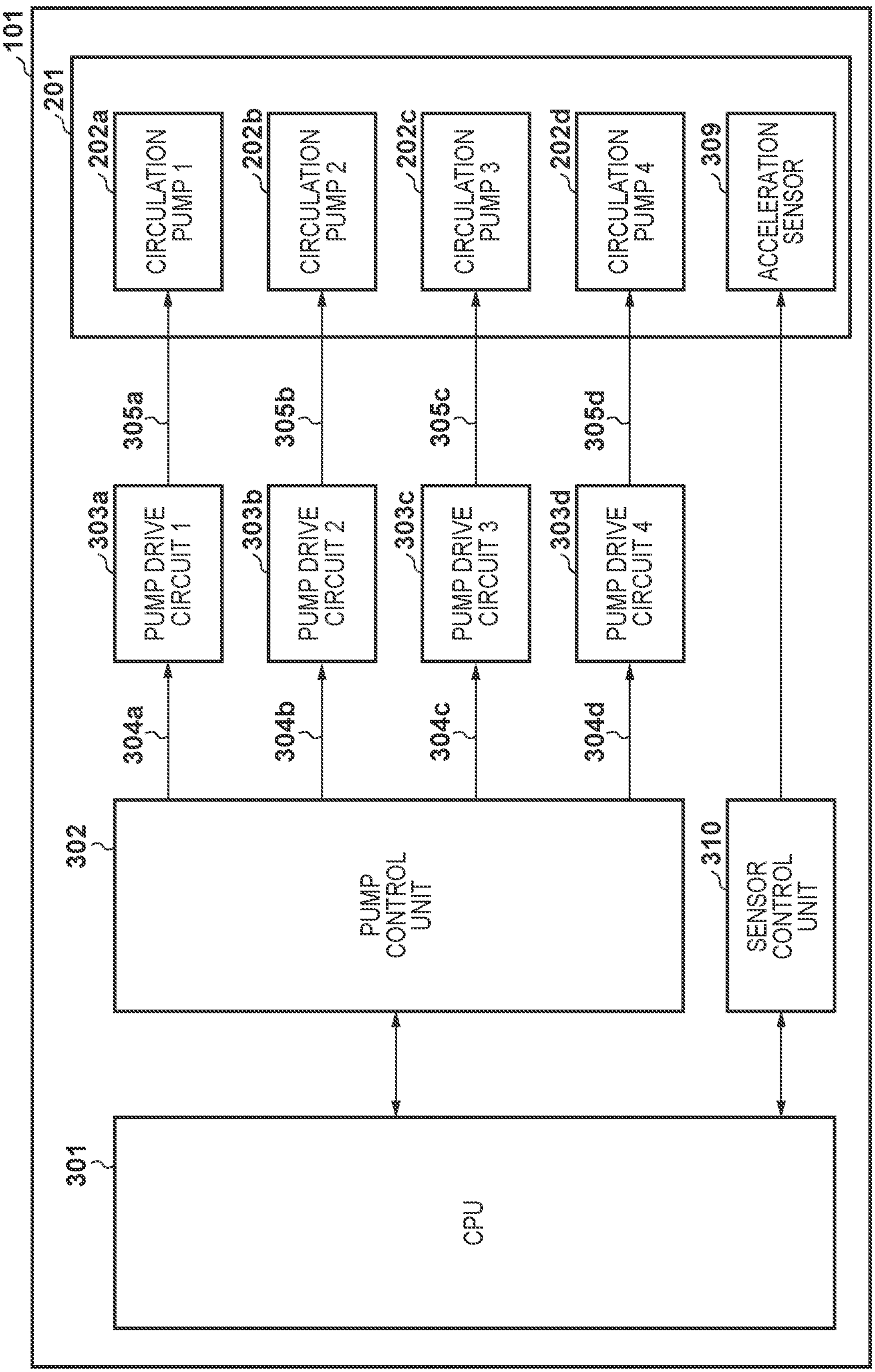
FIG. 2 is a block diagram illustrating a control configuration of a circulation pump in the printing apparatus.

FIG. 2 is a block diagram illustrating a control configuration of the circulation pump 202 in a printhead of the printing apparatus 101.

In FIG. 2, various setting information or the like based on user operation on the operation panel 102 or the like is input to a CPU 301. The information being input is stored in a memory 312 (see FIG. 4). The CPU 301 can read the information stored in the memory 312 as necessary and execute various processing based on the information being read. In other words, the CPU 301 includes a processing unit that executes various processing.

The printhead 201 can discharge a plurality of colors of ink, four ink colors, in the present embodiment, of Cyan (C), Magenta (M), Yellow (Y) and Black (B). Each color ink includes respective one of circulation pumps 202*a* to 202*d* (four circulation pumps in total). In other words, the printhead 201 includes a plurality of circulation pumps. The circulation pumps 202*a* to 202*d* are used for circulating ink of respective colors. The plurality of circulation pumps 202*a* to 202*d* are respectively driven by a plurality of pump drive circuits 303*a* to 303*d*.

The CPU 301 controls the pump drive circuits 303*a* to 303*d* using control signals 304*a* to 304*d* via the pump control unit 302. Furthermore, the pump drive circuits 303*a* to 303*d* drive the circulation pumps 202*a* to 202*d* by using the control signals 305*a* to 305*d*. In the following description, one of the circulation pumps 202*a* to 202*d* may be representatively referred to as a circulation pump 202. Similarly, the pump drive circuits 303*a* to 303*d*, the control signals 304*a* to 304*d*, and the control signals 305*a* to 305*d* may be representatively referred to as a pump drive circuit 303, a control signal 304, and a control signal 305, respectively.

In addition, the CPU 301 controls the acceleration sensor 309 (measurement unit) via the sensor control unit 310. The acceleration sensor 309 is arranged in the printhead 201, and can detect a vibration frequency and vibration acceleration in X, Y and Z each direction illustrated in FIG. 1.

Figure 3:
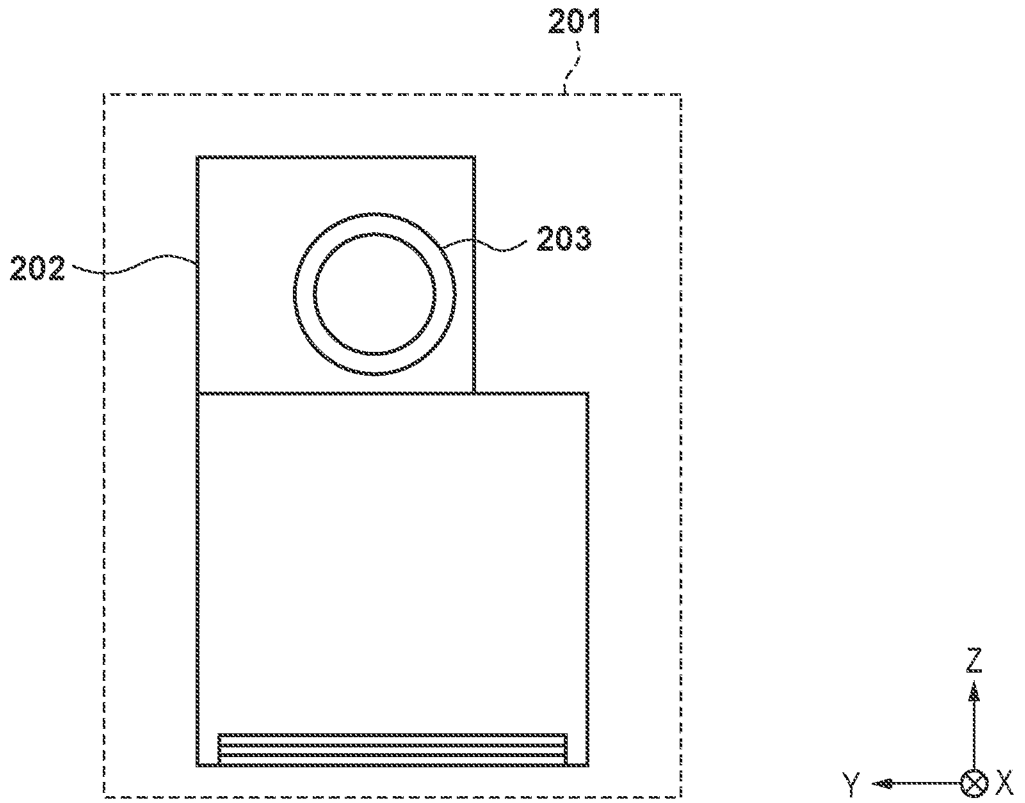
FIG. 3 is a schematic diagram illustrating a peripheral configuration of a circulation pump.

FIG. 3 is a schematic diagram illustrating a peripheral configuration of the circulation pump 202.

A piezoelectric element 203 configured to convert electrical energy to mechanical energy is provided to the circulation pump 202. When a voltage is applied between the terminals of the piezoelectric element 203, a strain proportional to the applied voltage is generated due to electrostrictive effect. Ink in the printhead 201 can be circulated by using the strain to vibrate a diaphragm (not illustrated) included in the circulation pump 202.

Figure 4:
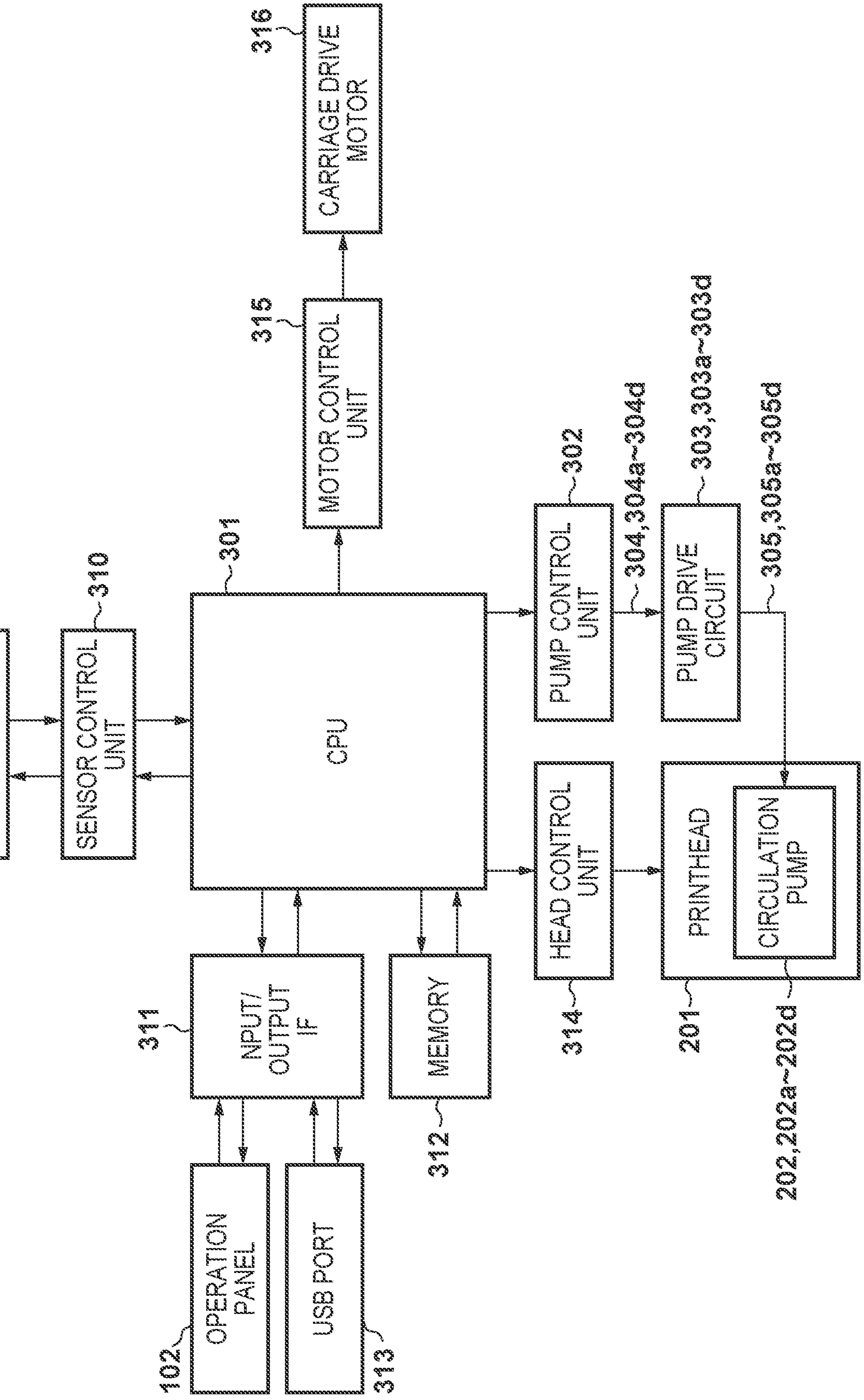
FIG. 4 is a block diagram illustrating a configuration of a control system included in the printing apparatus.

FIG. 4 is a block diagram illustrating a configuration of a control system included in the printing apparatus 101.

The CPU 301 controls each unit of the printing apparatus 101 according to a control program stored in the memory 312. The CPU 301 controls a carriage drive motor 316 via a motor control unit 315. The carriage drive motor 316 can move a carriage (not illustrated) and the printhead 201 mounted on the carriage by rotating a carriage belt (not illustrated).

The CPU 301 controls the ink discharge operation of the printhead 201 via a head control unit 314. In addition, the CPU 301 accepts user operation from the operation panel 102 via an input/output interface 311, and also receives print data or the like input from a USB port 313.

Relation between the CPU 301, and the pump control unit 302, the pump driving circuit 303, the circulation pump 202, the acceleration sensor 309 and the sensor control unit 310 is as described referring to FIG. 2.

<Control of Circulation Pump>

Control of the circulation pump will be described, referring to FIG. 2 to FIG. 4.

A plurality of circulation pumps 202 (202*a* to 202*d*) configured to circulate ink in the printhead 201 is mounted in the printhead 201. A drive voltage 305 to be applied to the piezoelectric element 203 is generally in the form of a rectangular wave or a sine wave.

The CPU 301 provides, to the pump control unit 302, a command related to driving of the circulation pump 202. As the content of the command, for example, start driving, terminate driving, drive frequency, or the like are conceivable. As a communication means configured to provide a command, for example, an Inter-Integrated Circuit (I2C), a Serial Peripheral Interface (SPI), or the like is conceivable. A control signal 304 according to the command is provided to the pump drive circuit 303 from the pump control unit 302. As the pump control unit 302, for example, a Field Programmable Gate Array (FPGA), a microcomputer, or the like is conceivable. As the control signal 304, for example, a rectangular wave or a sine wave is conceivable. A drive voltage 305 according to the control signal 304 is applied to the circulation pump 202 from the pump drive circuit 303.

<Basic Operation of Pump Drive Circuit>

Figure 5:
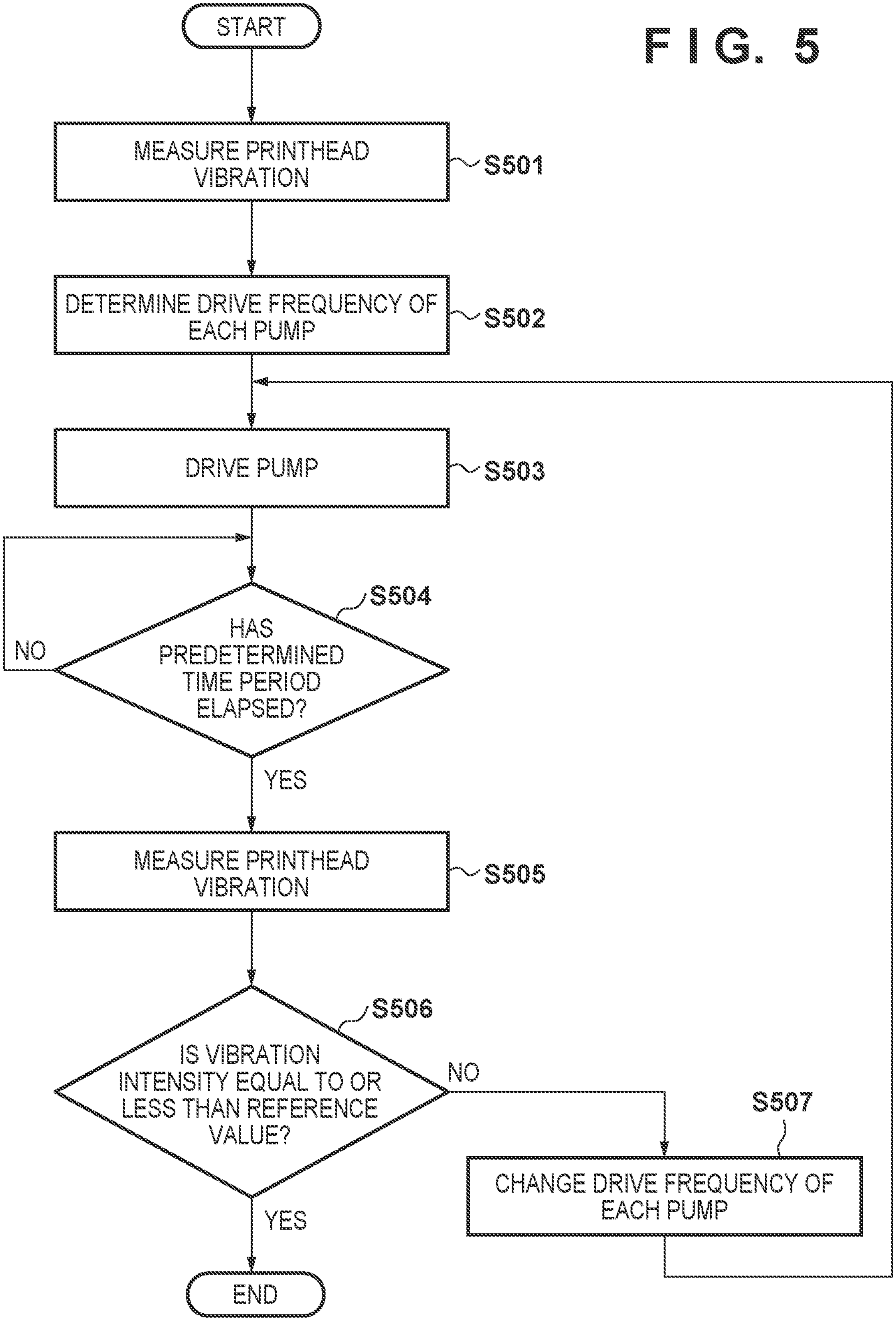
FIG. 5 is a flowchart illustrating a drive operation of the circulation pump.

FIG. 5 is a flowchart illustrating a drive operation of the circulation pump 202.

Figure 6A:
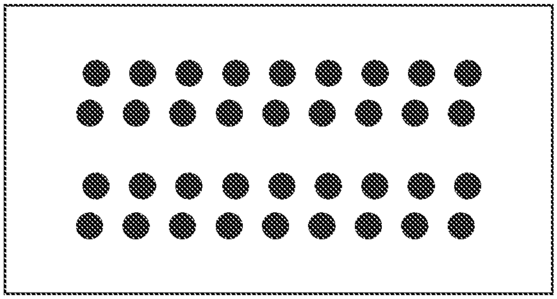
FIG. 6A and FIG. 6B are diagrams illustrating examples of ink landing when a printhead vibrates.
Figure 6B:
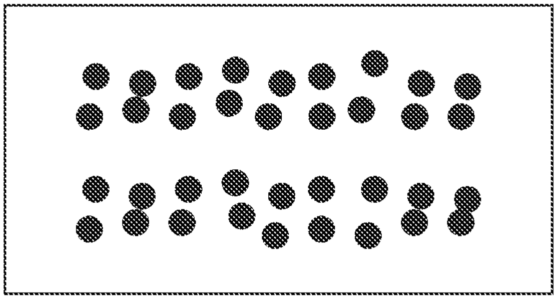

As the circulation pump 202 is mounted on the printhead 201, when the piezoelectric element 203 in the circulation pump 202 is driven, the printhead 201 vibrates. FIG. 6A and FIG. 6B are diagrams schematically illustrating landing positions of liquid droplets discharged from the printhead 201 in a case of a small vibration and in a case of a large vibration, respectively. When the vibration is small, the landing positions of discharged liquid droplets have no disorder as illustrated in FIG. 6A. When, on the other hand, the vibration is large, the landing positions of discharged liquid droplets have disorder as illustrated in FIG. 6B, and as a result, image unevenness occurs.

In order to suppress the disorder of landing positions, the following operation is performed in the present embodiment.

First, at step S501, the CPU 301 measures the vibration of the printhead 201 by using an acceleration sensor 309. More specifically, a command related to driving of the circulation pump 202 is provided from the CPU 301 to the pump control unit 302, in driving the circulation pump 202. The printhead 201 also vibrates due to its own ink discharge operation, and therefore the acceleration sensor 309 measures the vibration frequency and the vibration acceleration in X, Y and Z directions of the printhead 201 including the peripheral mechanism, when the circulation pump 202 is not driven. The CPU 301 then stores the measurement result in the memory 312.

Figure 7:
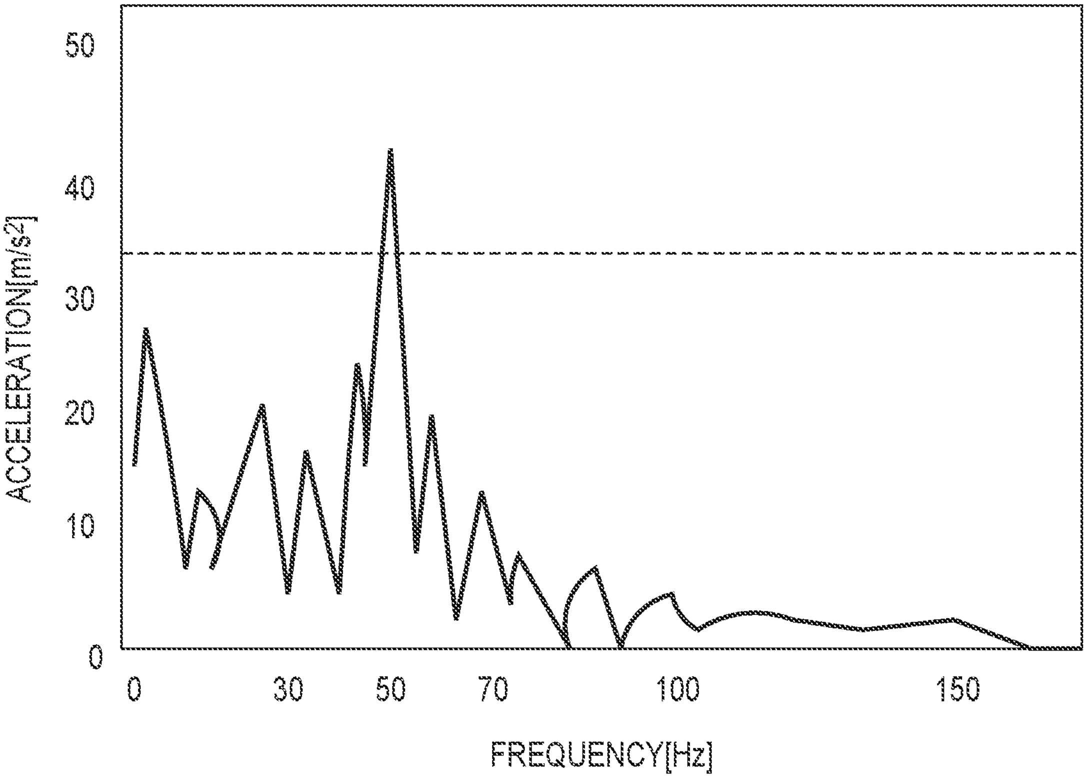
FIG. 7 is a diagram illustrating vibration of a printhead when a circulation pump is driven.

At step S502, the CPU 301 sets the drive frequency of the circulation pump 202 in accordance with the vibration frequency and the vibration acceleration of the printhead 201 measured using the acceleration sensor 309 at step S501. The CPU 301 performs the setting such that the natural frequency (resonance frequency) of the printhead 201 including the peripheral mechanism stored in the memory 312 does not coincide with the drive frequency during driving of the circulation pump 202. For example, FIG. 7 is a diagram illustrating vibration of the printhead 201 during driving of the circulation pump 202, with the maximum acceleration of the vibration in the vertical axis and the frequency in the horizontal axis. It can be seen from the graph that the vibration becomes large at 50 Hz.

The drive frequency of the circulation pump 202 is set within a predetermined frequency range suitable for circulating the ink. In this case, the drive frequency of the circulation pump is set such that the natural frequency (resonance frequency) of the printhead 201 including the peripheral mechanism does not coincide with the drive frequency of the circulation pump 202. In the example of FIG. 7, for example, the vibration acceleration of the peripheral mechanism of the printhead 201 has a peak at 50 Hz, and therefore the drive frequency of the circulation pump 202 is determined to be a value such as 30 Hz, 40 Hz, 60 Hz or 70 Hz, avoiding 50 Hz.

At step S503, the CPU 301 drives the circulation pump 202. In this case, the drive frequency of the circulation pump 202 is set to a value such as 30 Hz, 40 Hz, 60 Hz or 70 Hz, as has been described above.

At step S504, the CPU 301 determines, in order to drive the circulation pump 202 for a predetermined time period, whether or not a predetermined time has elapsed since driving of the circulation pump 202 is started. The predetermined time is preliminarily input and set via the operation panel 102 by the administrator of the printing apparatus 101. The CPU 301 advances the processing to step S505 when a predetermined time has elapsed at step S504, or continues driving the circulation pump 202 until the predetermined time has elapsed.

At step S505, the CPU 301 measures the vibration of the printhead 201. As at step S501, the vibration frequency and the vibration acceleration of the printhead 201 are measured using the acceleration sensor 309 in the printhead 201.

At step S506, the CPU 301 determines whether or not the intensity of vibration of the printhead 201 measured at step S505 is equal to or less than a reference value. It is assumed in the present embodiment that the intensity of vibration is represented by the maximum acceleration of vibration. However, the intensity of vibration is not limited to be represented by the maximum acceleration of the vibration, and other values such as the maximum amplitude may be used.

As an example, the reference value is indicated by the dotted line in FIG. 7 for a case where a resonance frequency including the peripheral mechanism of the printhead 201 is 50 Hz. In FIG. 7, the maximum acceleration of the vibration of the printhead 201 is about 30 [$m/s^2$] or less except for the 50 Hz that is a resonance point, and thus the reference value of the maximum acceleration of the vibration is set to be 35 [$m/s^2$], for example. The maximum acceleration of the vibration exceeds the reference value of 35 [$m/s^2$] at the 50 Hz that is the resonance point, and therefore the drive frequency of the circulation pump 202 is set to a value such as 30 Hz, 40 Hz, 60 Hz or 70 Hz, avoiding a range of about plus or minus 20 Hz of 50 Hz, as has been described above.

When the intensity of the vibration exceeds the reference value at step S506, the CPU 301 advances the processing to step S507, or the CPU 301 terminates the processing of the flow of FIG. 5 when the intensity of the vibration does not exceed the reference value. When the processing of the flow of FIG. 5 is completed and the vibration intensity of the printhead 201 is suppressed to or below the reference value, the printing apparatus 101 comes to be in a state where a printing is enabled.

At step S507, the CPU 301 changes the drive frequency of the circulation pump 202. In other words, when the intensity of the vibration measured at step S505 is larger than the reference value indicating the tolerable vibration range, the drive frequency of the circulation pump 202 is set again. As has been already described, when the resonance frequency of the printhead 201 including the peripheral mechanism is 50 Hz, for example, the drive frequency of the circulation pump 202 is determined to be 40 Hz, 60 Hz, 70 Hz, 80 Hz or the like. The foregoing processing is repeated until the measured vibration intensity becomes to be equal to or less than the reference value indicating the tolerable vibration range. When the vibration intensity consecutively exceeds the reference value three times, the CPU 301 determines this as an error.

As has been described above, by setting the drive frequency of the circulation pump 202 of the ink not overlapping with the resonance frequency of the printhead 201 including the peripheral mechanism, the circulation pump 202 can be driven in a state where the vibration is suppressed to be minimum. The foregoing allows for providing a printing apparatus that can perform printing with stable image quality.

Second Embodiment

Figure 8:
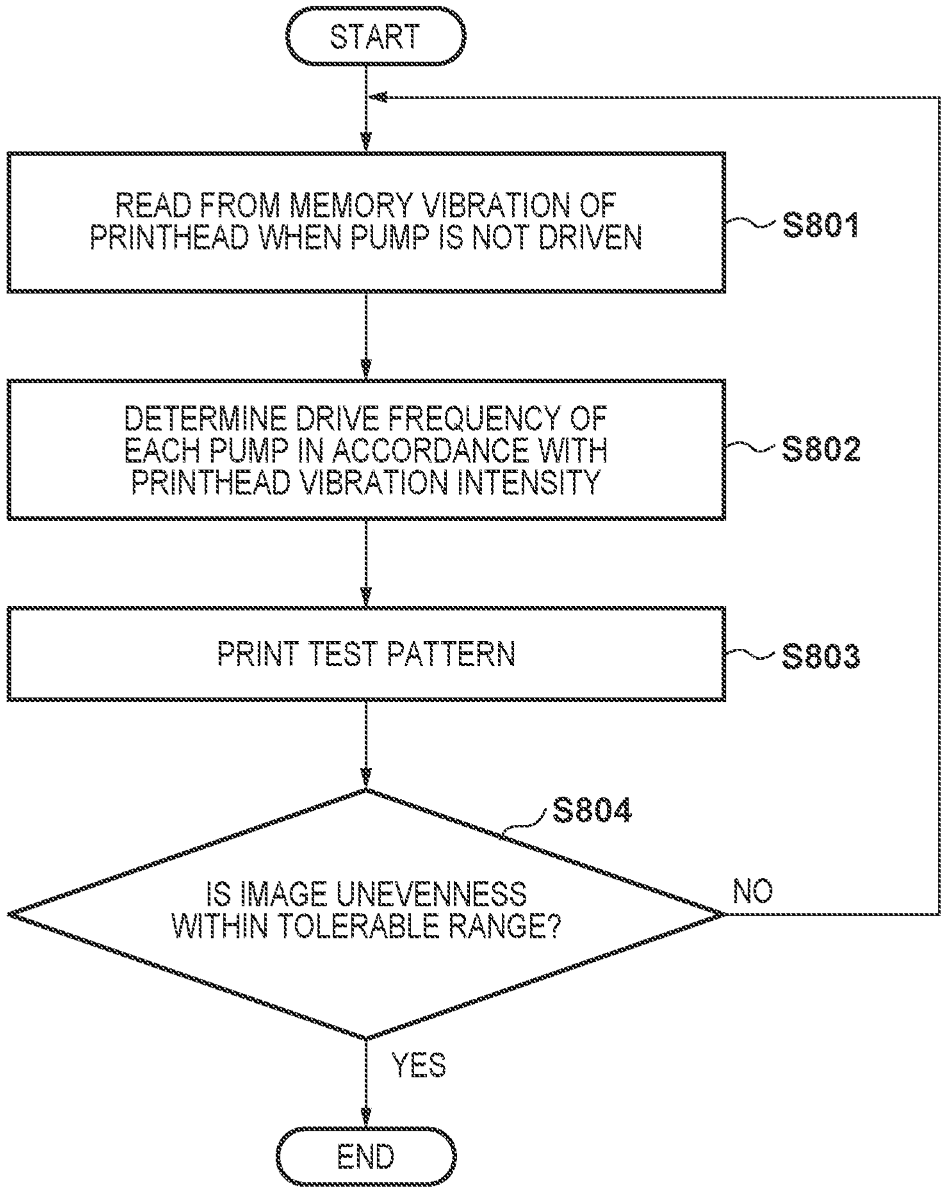
FIG. 8 is a flowchart illustrating a drive operation of the circulation pump according to a second embodiment.

FIG. 8 is a flowchart illustrating a drive operation of the circulation pump 202 according to a second embodiment. The configuration of the second embodiment is similar to that of the first embodiment except for the operation of the flowchart.

At step S801, the CPU 301 reads, from the memory 312, data indicating the relation between the vibration frequency and the vibration intensity of the printhead 201 including the peripheral mechanism. It is assumed in the present embodiment that the relation between the vibration frequency and the vibration intensity of the printhead 201 including the peripheral mechanism is preliminarily measured and stored in the memory 312. As data of a resonance frequency and vibration intensity, the data of the latest date are read from the stored data. When reading data for the second time or later, the latest data next to the data read for the first time is read.

At step S802, the CPU 301 sets the drive frequency of the circulation pump 202 in accordance with the data of the vibration frequency and the vibration intensity that was read at step S801. The setting method is similar to that of step S502 of FIG. 5.

At step S803, the CPU 301 causes the printhead 201 to print a test pattern, in a state where the circulation pump 202 is driven at the drive frequency set at step S802. The term "test pattern" refers to image data preliminarily stored in the CPU 301, which is the image data facilitates determination of the ink landing state due to the vibration of the printhead 201.

At step S804, the CPU 301 causes the scanner to read a printed product on which the test pattern is printed, and determines whether or not the image unevenness is within a tolerable range. Detection of the image unevenness is performed as follows. The read-out data being read (pixel values of each of the pixels in the imaging element used for reading) is divided into N blocks in the printing direction, and respective RGB values of the N blocks are calculated. An evaluation value is calculated that is the difference between the maximum value and the minimum value among the N RGB values. The tolerable range of the evaluation value varies depending on the administrator, thus the tolerable range of image unevenness is determined by the administrator. The CPU 301 terminates the operation of the flow of FIG. 8 when the evaluation value falls within a criterion determined by the administrator. Printing is then started.

When the evaluation value does not fall within the criterion, the CPU 301 returns the processing to step S801, reads the next latest data among the data stored in the memory 312, and repeats the operation from S802 to S804.

Third Embodiment

In a third embodiment, the processing at step S502 of FIG. 5 is different from that of the first embodiment.

In the present embodiment, the CPU 301 can change not only the drive frequency but also the phase of the circulation pump 202 (at least one of the frequency or the phase can be changed). The vibration of the printhead 201 including the peripheral mechanism can be suppressed by changing not only the frequency component but also the phase to cause the printhead 201 and the circulation pump 202 vibrate in a manner suppressing vibration of each other. In addition, it is also possible to suppress vibration due to the circulation pump 202 and reduce power consumption, by switching ON and OFF while the printhead 201 is driven.

Fourth Embodiment

In a fourth embodiment, the processing at step S502 of FIG. 5 is different from that of the first embodiment.

The vibration of the printhead 201 becomes larger when the carriage is accelerating compared to a case where the carriage is moving at a constant speed. This is because acceleration, that is, a force is applied to the printhead 201 in a state where the carriage is being accelerated (during acceleration). In addition, sedimentation rate of the ink differs depending on the color (or the type of ink), and therefore the drive states of the four circulation pumps 202*a* to 202*d* also differ for each color (each type of ink).

For example, when the sedimentation rate of ink A is assumed to be 1, ink B has the sedimentation rate of double rate, ink C has the sedimentation rate of triple rate, and ink D has the sedimentation rate of the same rate of that of ink A. In such a case, the circulation pumps 202 need to be driven with higher priority, which are for ink B and C that have higher sedimentation rate. Therefore, it becomes possible to suppress vibration of the printhead 201 in an acceleration region where the vibration of the printhead 201 is large, by driving only the circulation pumps 202 (some of the plurality of circulation pumps) for ink B and C without driving the circulation pumps 202 for ink A and D in the acceleration region.

As such, all the circulation pumps 202 are driven in the constant speed region, but only the circulation pumps 202 for ink B and C are driven in the acceleration region. The foregoing method allows for suppressing the vibration of not only the printhead 201 but also the entire peripheral mechanism.

Fifth Embodiment

In a fifth embodiment, the processing at step S502 of FIG. 5 is different from that of the first embodiment.

Figure 9:
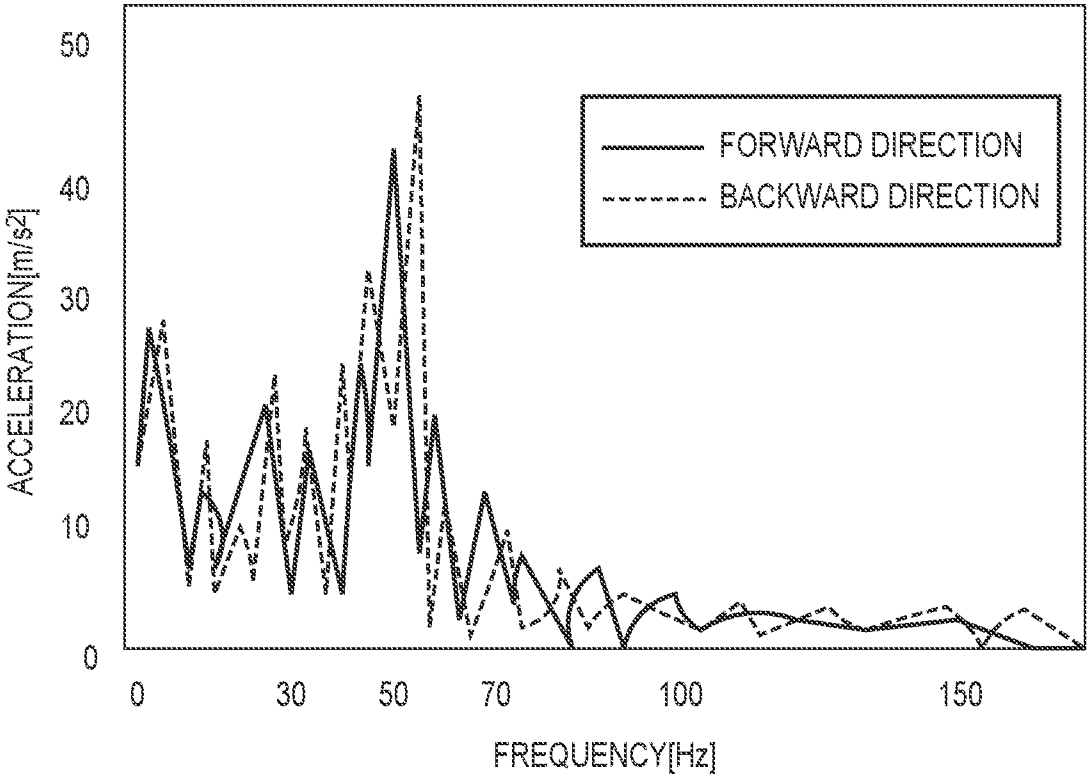
FIG. 9 is a diagram illustrating vibration of the printhead in a forward direction and a backward direction of the printhead.

The printhead 201 reciprocally scans, and the vibration of the printhead 201 may differ depending on the direction of the reciprocal scanning. FIG. 9 is a diagram illustrating the vibration of the printhead 201 in the forward direction and the backward direction of the printhead 201 (carriage), with the maximum acceleration of the vibration in the vertical axis and the frequency in the horizontal axis. The frequency at which the vibration is large and the intensity of vibration (maximum acceleration of vibration) vary between the forward direction (forward path) and the backward direction (backward path). Therefore, by changing the frequency for driving the circulation pump 202 between the forward direction and the backward direction, it becomes possible to suppress the vibration of the printhead 201 including the peripheral mechanism. Here, the phase or the control waveform may be changed, instead of the frequency.

Sixth Embodiment

In a sixth embodiment, the processing at step S502 of FIG. 5 is different from that of the first embodiment.

For example, considering a case for the fourth embodiment where the circulation pumps 202 for ink B and C is driven with higher priority and the circulation pumps for ink A and D may or may not be driven. In such a case, a driving method is selected to reduce the current consumption of the printing apparatus 101 by not driving the circulation pumps for ink A and D. It is therefore possible to reduce power consumption of the printing apparatus 101.

Here, the number of the control signals 304 from the pump control unit 302 to the pump drive circuit 303 is not limited to four as illustrated in FIG. 2. The number of the pump drive circuits 303 controlled by the pump control unit 302 is not limited to four. Therefore, a plurality of pump drive circuits 303 may be controlled by a single pump control unit 302. A single pump driving circuit 303 may drive a plurality of the circulation pumps 202 or the piezoelectric elements 203 included in the circulation pumps 202.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2023-056357, filed Mar. 30, 2023, which is hereby incorporated by reference herein in its entirety.

What is claimed is:

1. A pump apparatus configured to circulate liquid in a printhead configured to discharge the liquid, the pump apparatus comprising:

a drive unit configured to circulate the liquid; and a control unit configured to control operation of the drive unit based on information related to vibration of the printhead such that the printhead does not resonate due to vibration of the operation of the drive unit.

2. The pump apparatus according to claim 1, wherein the control unit controls at least one of a frequency or a phase of the operation of the drive unit.

3. The pump apparatus according to claim 2, wherein the control unit differentiates the frequency of operation of the drive unit from a resonance frequency of the printhead.

4. The pump apparatus according to claim 2, wherein the control unit differentiates the phase of operation of the drive unit from a phase of vibration of the printhead.

5. The pump apparatus according to claim 1, wherein information related to vibration of the printhead is information related to vibration of the printhead including a peripheral mechanism of the printhead.

6. The pump apparatus according to claim 1, wherein information related to vibration of the printhead is information acquired by measuring vibration of the printhead.

7. The pump apparatus according to claim 6, further comprising a measurement unit configured to measure vibration of the printhead.

8. The pump apparatus according to claim 7, wherein the measurement unit measures vibration of the printhead in a state where the drive unit is operating, and when the intensity of the vibration being measured exceeds a reference value, at least one of a frequency or a phase of operation of the drive unit is changed.

9. The pump apparatus according to claim 1, wherein information relating to vibration of the printhead is information acquired by preliminarily measuring and storing vibration of the printhead.

10. The pump apparatus according to claim 9, further comprising a storage unit configured to store information related to vibration of the printhead.

11. The pump apparatus according to claim 1 comprising a plurality of the drive units, wherein the control unit operates less than all of the plurality of drive units during acceleration of the printhead.

12. The pump apparatus according to claim 1, wherein the printhead reciprocally scans, and the control unit changes at least one of a frequency or a phase for operating the drive unit between a forward path and a backward path of the printhead.

13. A printing apparatus comprising:

a pump apparatus configured to circulate liquid in a printhead configured to discharge the liquid, the pump apparatus including a drive unit configured to circulate the liquid, and a control unit configured to control operation of the drive unit based on information related to vibration of the printhead such that the printhead does not resonate due to vibration of the operation of the drive unit;

the printhead; and a carriage configured to cause the printhead to reciprocally scan.

14. A method for controlling a pump apparatus including a drive unit configured to circulate liquid in a printhead configured to discharge the liquid, the method comprising:

controlling, based on information related to vibration of the printhead, operation of the drive unit such that the printhead does not resonate due to vibration of the operation of the drive unit.

15. A non-transitory computer-readable storage medium storing a program for causing a computer to execute a method of controlling a pump apparatus including a drive unit configured to circulate liquid in a printhead configured to discharge the liquid, the method comprising:

controlling, based on information related to vibration of the printhead, operation of the drive unit such that the printhead does not resonate due to vibration of the operation of the drive unit.

* * * * *